United States Patent
Kuenen

(10) Patent No.: US 6,247,922 B1
(45) Date of Patent: Jun. 19, 2001

(54) HELICAL OVEN WITH IMPROVED BELT DRIVE

(75) Inventor: Hendrikus Antonius Jacobus Kuenen, Overloon (NL)

(73) Assignee: Koppens B.V., Bakel (NL)

( * ) Notice: Subject to any disclaimer, the term of this patent is extended or adjusted under 35 U.S.C. 154(b) by 0 days.

(21) Appl. No.: 09/586,763

(22) Filed: Jun. 5, 2000

(30) Foreign Application Priority Data

Jun. 4, 1999 (NL) .................................................. 1012244

(51) Int. Cl.[7] ...................................................... F27B 9/14
(52) U.S. Cl. ...................... 432/143; 432/152; 99/443 C; 99/443 R
(58) Field of Search .......................... 432/8, 142, 144, 432/152, 143; 219/388; 99/443 C, 443 R, 478; 34/203, 207, 208, 216, 217

(56) References Cited

U.S. PATENT DOCUMENTS

| 3,269,142 | 8/1966 | DeMola et al. |  |
|---|---|---|---|
| 4,944,162 | 7/1990 | Lang et al. |  |
| 5,243,962 | * 9/1993 | Hwang | 99/443 C |
| 5,329,916 | * 7/1994 | Lygum | 432/128 |
| 5,836,240 | * 11/1998 | Kuenen | 99/443 C |
| 6,065,463 | * 5/2000 | Martin | 99/443 C |

FOREIGN PATENT DOCUMENTS

0558151A1  9/1993 (EP) .
0578523A1  1/1994 (EP) .

* cited by examiner

*Primary Examiner*—Gregory Wilson
(74) *Attorney, Agent, or Firm*—Young & Thompson

(57) ABSTRACT

An oven comprises a housing provided with heating means, as well as an endless conveyor belt on which products to be heated can be accommodated and can be transported through the housing between an entrance to and exit from said housing, which conveyor belt is guided in the housing helically around each of two drums, which conveyor belt is guided in the housing helically around each of two drums, which are arranged in the housing such that they can be driven about their vertical axis, and is guided straight between two helical paths. The conveyor belt is supported, over at least one of the straight guided paths, by support means that can be moved in the same direction as the conveyor belt.

19 Claims, 3 Drawing Sheets

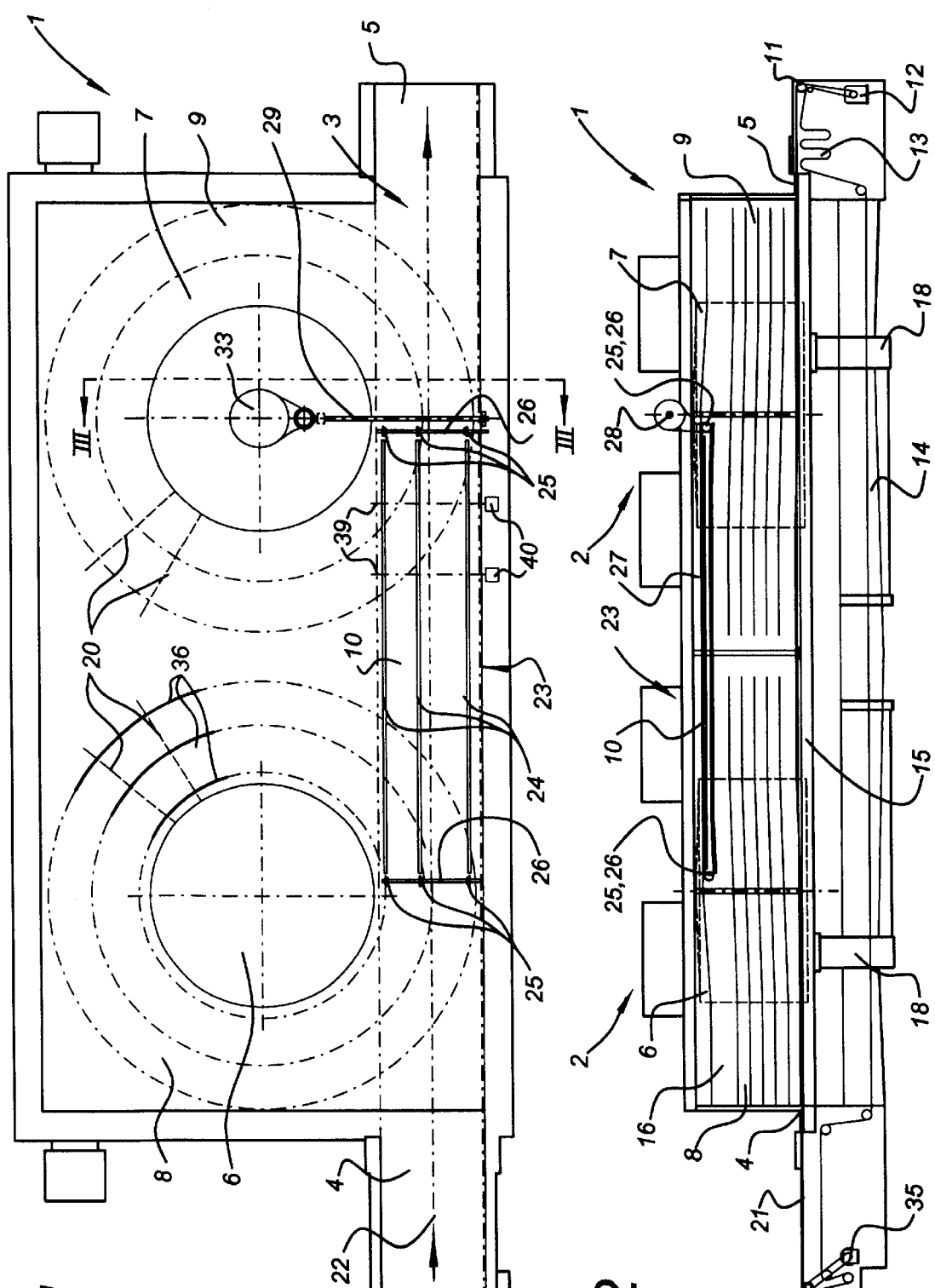

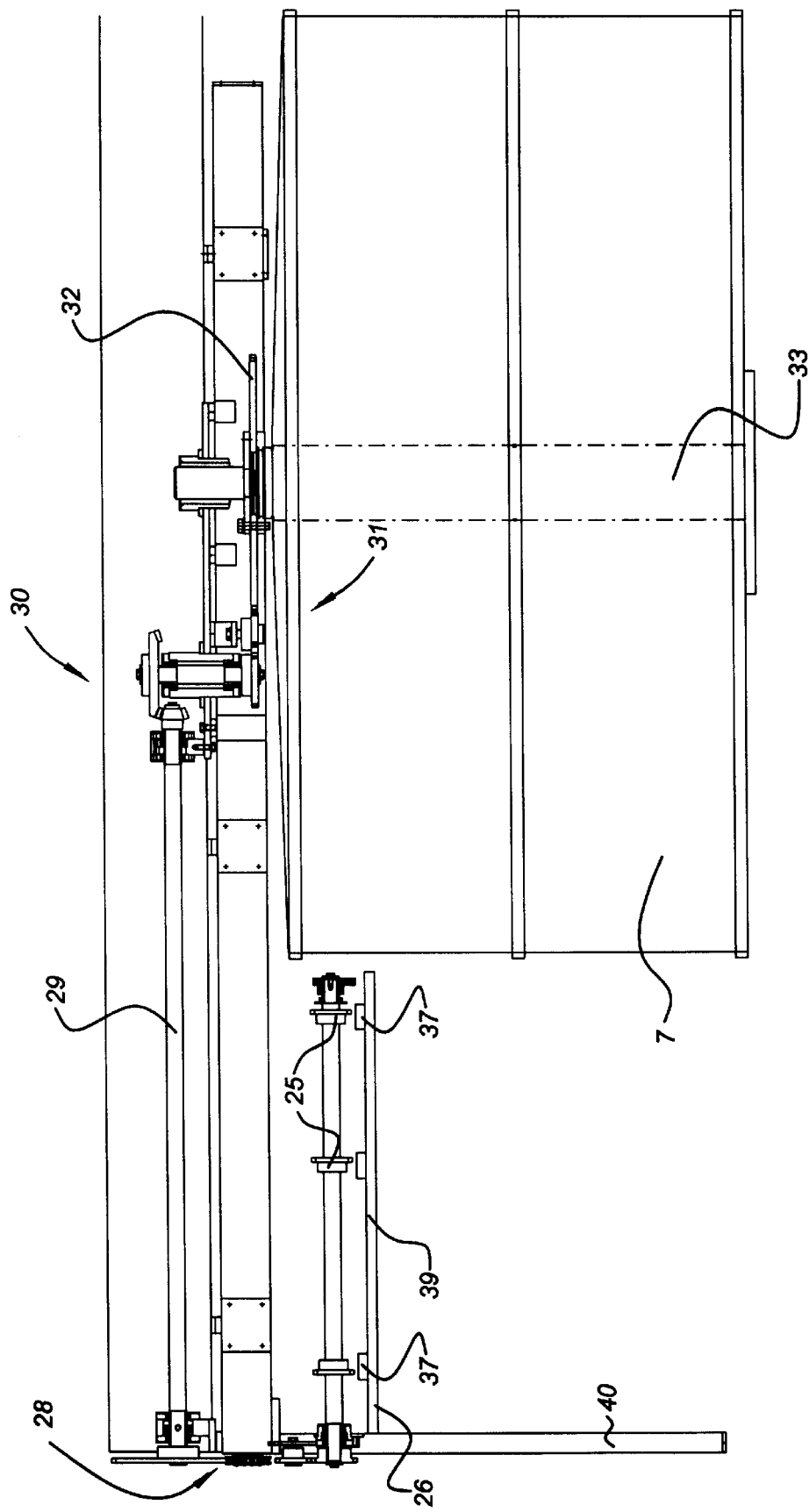

HELICAL OVEN WITH IMPROVED BELT DRIVE

FIELD OF THE INVENTION

The invention relates to an oven, comprising a housing provided with heating means, as well as an endless conveyor belt on which products to be heated can be accommodated and can be transported through the housing between an entrance to and an exit from said housing, which conveyor belt is guided in the housing helically around each of two drums, which are arranged in the housing such that they can be driven about their vertical axis, and is guided straight between the two helical paths.

BACKGROUND OF THE INVENTION

An oven of this type is disclosed in EP-A 558 151. The conveyor belt thereof is held clamped around the two drums under the influence of a pretensioning force. The drums can drive the conveyor belt under the influence of the friction generated by this pretensioning force.

The conveyor belt is additionally subjected to the tensile force generated by the drums, which is required in order to propel the conveyor belt in the direction of transport. This tensile force can be appreciable since it must be greater than the frictional forces produced by the means supporting the transport.

The support for the conveyor belt comprises a number, usually two or three, of parallel guide sections over which the conveyor belt slides. At the location of the drums said frictional forces are directly cancelled out by the driving action of the drums, so that the tensile forces in the conveyor belt remain restricted at this location. However, especially in the belt return loop and in the section of the conveyor belt that crosses between the drums fairly high tensile forces arise.

The tensile forces arising in the belt return loop are partly compensated for by an axillary drive unit which is connected to a return shaft at the location of the entrance to the housing.

These problems, which are associated with the tensile force in the conveyor belt, arise to an increased extent in ovens of a larger capacity, that is to say ovens with a fairly broad conveyor belt. In particular the section of the conveyor belt that forms the crossover from the first to the second helical path is exposed to fairly high tensile forces.

SUMMARY OF THE INVENTION

The aim of the invention is to provide an oven of the abovementioned type with which the forces arising in the conveyor belt can be better controlled. Said aim is achieved in that the conveyor belt is supported, over at least one of the straight guided paths, by support means that can be moved in the same direction as the conveyor belt.

Compared with support by means of guide sections, the support means according to the invention first of all result in a lower frictional resistance. The tensile force in the belt decreases as a result, especially in the relatively highly stressed section of the conveyor belt close to the run-in into the second helical path.

A further reduction in the tensile force in the conveyor belt can be obtained if the support means exert a driving action on the conveyor belt in the direction of transport thereof. Said driving action can, for example, be obtained in that the support means can be driven at a speed which is higher than that of the conveyor belt.

Because the support means run somewhat faster than the conveyor belt, the latter is pulled along in the direction of transport as a consequence of the sliding movement and friction generated. The tensile force in the belt is further reduced as a result, especially at the location of the run-in into the second helical path.

The support means can have their own independent drive, which must be synchronised with the drive for the drums. Preferably, the support means can be driven by means of a drive which is coupled to at least one of the drums. The drive concerned can be a drive with chains, gears and the like. The advantage of this is that in this case no separate electronic control is required for driving the support means, whilst synchronous running is nevertheless obtained.

The support means can be constructed in various ways. According to a first possibility the support means are an endless element having an upper part on which the conveyor belt bears, which upper part can be moved in the same direction as the conveyor belt. Such an element can comprise, for example, a chain which is guided over two shafts which are provided with sprockets.

Such a chain can comprise links which, in the upper part, each have a support surface facing the conveyor belt. Preferably two or three parallel chains are used. Of course, an ordinary chain can also be used.

According to an alternative possibility, the endless element can comprise a flexible belt. According to a further alternative the support means can comprise at least one support roller or support shaft.

A wire belt known per se is used in the oven according to the invention, which belt comprises wire pieces which are oriented transversely to the conveyor belt and are attached to one another, such that they can rotate, around two axes oriented transversely to the direction of transport, one of which is in the plane of the conveyor belt and the other of which is oriented perpendicularly thereto, as well as at least one conveyor chain which is connected to or incorporated in the wire belt, which wire belt is guided over return shafts which are provided with sprockets for the conveyor chain.

At least one of the return shafts can be driven to provide supplementary driving of the conveyor belt in the direction of transport. Furthermore, with this arrangement a tensioning device is provided for tensioning the conveyor belt around the two drums.

The support means according to the invention can be arranged at various locations in the belt path as a whole. According to a first possibility, the support means are arranged below the straight path which extends between the two helical paths and is located inside the housing.

The support means can also have been arranged below the return path which extends between the exit from and the entrance to the housing.

BRIEF DESCRIPTION OF THE DRAWINGS

The invention will be explained in more detail below with reference to an illustrative embodiment shown in the figures.

FIG. 1 shows a plan view of an oven according to the invention.

FIG. 2 shows a side view of a longitudinal section of the oven according to the invention.

FIG. 3 shows the view III—III according to FIG. 1.

DETAILED DESCRIPTION OF THE DRAWINGS

Figure 4:
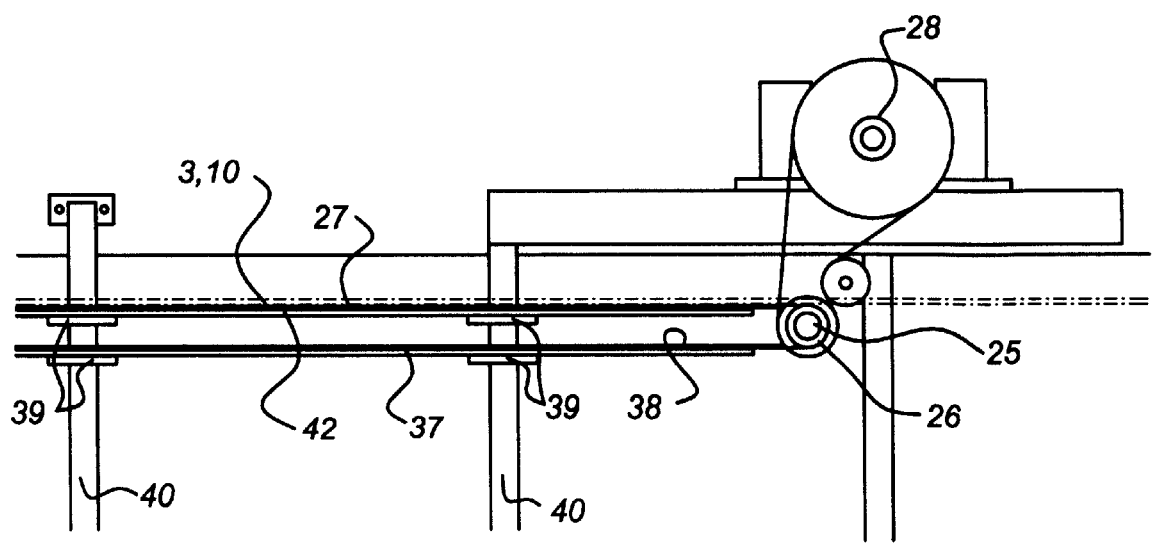
FIG. 4 shows an enlarged detail.

The oven shown in FIGS. 1 and 2 comprises a housing 1 provided with heating means 2. An endless conveyor belt 3 is guided through the housing 1, which conveyor belt extends from the entrance 4 to the exit 5 of the housing. The products to be heated in the oven, for example meat products such as hamburgers, chicken products, schnitzels and the like, can be accommodated on the conveyor belt 3.

Two drums 6, 7, around which the conveyor belt 3 is wound in helical paths 8, 9 are arranged in the housing 1.

Starting at the entrance 4, the belt 3 runs helically in accordance with the path 8 upwards around the first drum 6. Close to the uppermost end of the drum 6 the belt 3 crosses over, in accordance with the straight part 10, to the second drum 7, around which the belt runs downwards in accordance with the second helical path 9 to the exit 5.

Beyond the exit 5 the conveyor belt is routed around a return shaft 11, a pretensioning device 12 and a compensation device 13 for taking up differences in length on heating/cooling of the belt.

Via the belt return loop 14, the belt runs further via the auxiliary drive 35 to the entrance 4.

The bottom of the housing 1 is formed by a tray 15 on which the drums 6, 7 are supported. Said tray 15 has a raised edge on which the cover 16 of the housing bears. Said cover 16 can be moved upwards, away from the tray 15, such that the interior of the oven is accessible for cleaning activities, repair work and the like. The tray 15 is supported by means of legs 18. Finally, the drive devices (not shown) for the drums 6, 7 are located below the tray 15.

The drums 6, 7 are made to rotate by means of these drive devices. The conveyor belt 3 is pulled taut around the periphery of the drums 6, 7 under the influence of the pretensioning device 12. As a consequence of the friction generated during this operation, the helical paths 8, 9 of the conveyor belt 3 are made to turn by the drums 6 and 7, respectively.

The conveyor belt 3 is supported over the path extending through the oven by guide setions 36 extending in its longitudinal direction, which guide sections 36 are, in turn, supported by supports 20 arranged transversely. For the sake of clarity, a few of these supports 20 and only part of guide sections 36 are shown. Said guide sections 36 are coated with a material which has a low coefficient of friction, such that the friction of the moving belt relative to these strips remains restricted.

Nevertheless, especially in the case of belts of fairly wide width, for example of approximately 1 meter, fairly high tensile forces still arise. These tensile forces remain restricted at the location of the helical paths 8, 9 since in this location the belt is also driven directly by the drums. However, the belt return loop 14, and also the straight section 21 of the conveyor belt 3 running inwards via the entrance 4, and the section 10 of the conveyor belt 3 extending between the helical paths 8, 9 give rise to fairly high tensile forces.

This fairly high tensile force arises at the point where the straight belt section 21 runs into the first helical path 8. An auxiliary drive 35, which, for example, can comprise a driven return shaft, is fitted in a known manner in order to reduce this tensile force. Said return shaft comprises a sprocket (not shown), which engages with the chain section 22, known per se, provided in the middle of the conveyor belt 3.

Fairly high tensile forces also arise at the point where the straight conveyor belt section 10 runs into the second helical path 9. According to the invention the support means, indicated in their entirety by 23, are arranged here. These support means comprise three chains 24, each of which is wrapped around sprockets 25 mounted on the shafts 26.

As can be seen in the side view in FIGS. 2 and 4, the chains 24 have an upper part 27, on which the conveyor belt section 10 is supported. By now driving this upper part 27 of the chains 24 somewhat faster than the speed of propulsion of the conveyor belt 3, a driving action is exerted on the conveyor belt section 10.

The advantage of this is that, firstly, no friction hindering the forward movement of this part of the conveyor belt arises, so that the tensile force at the run-in into the helical path 9 remains restricted.

As a consequence of the driving action of the chains 24 on the conveyor belt section 10, an even greater reduction in the tensile force in the conveyor belt 3 is obtained at that point.

The chains are driven by means of the shaft 26, which is coupled via a sprocket and chain transmission 28 to the drive shaft 29. The latter is, in turn, connected via right-angle gear transmission 30 to the sprocket and chain transmission indicated in its entirety by 31. The sprocket 32 thereof is fixed to the rotary shaft 33 of the drum 7.

In this way synchronisation is obtained between the drums 6, 7 and the chains 24, so that the desired driving action of the support means 23 on the conveyor belt section 10 can always be ensured.

Notwithstanding the fact that in the figures support means 23 are arranged only beneath the straight conveyor belt section between the two helical paths in the housing, said support means can also be arranged in a different location. Support means beneath the return path 14, which could replace the auxiliary drive 35, are mentioned as an example.

Problems in the synchronisation between the drum drive and the auxiliary drive are efficiently avoided in this way.

The various support means can also be used in combination with one another.

The top parts 27 of the chains 24 are each supported by a strip 42. As a result, said chain part 27 is always in contact over its entire length with the underside of the upper conveyor belt section 10, as a result of which good carrier action is ensured.

The lower part 38 of the chains 24 is likewise supported by a strip 37. The strips 36, 37 are, in turn, supported by transverse supports 39, which are fixed to uprights 40.

What is claimed is:

1. Oven, comprising a housing (1) provided with heating means (2), as well as an endless conveyor belt (3) on which products to be heated can be accommodated and can be transported through the housing (1) between an entrance (4) to and an exit (5) from said housing (1), which conveyor belt (3) is guided in the housing helically around each of two drums (6, 7), which are arranged in the housing (1) such that they can be driven about their vertical axis (33), and is guided straight between two helical paths, characterised in that the conveyor belt (3) is supported, over at least one of the straight guided paths (10), by support means (23) that can be moved in the same direction as the conveyor belt (3).

2. Oven according to claim 1, wherein the support means (23) exert a driving action on the conveyor belt (3, 10) in the direction of transport thereof.

3. Oven according to claim 2, wherein the support means (23) can be driven at a speed which is higher than that of the conveyor belt (3, 10).

4. Oven according to claim 2, wherein the support means (23) can be driven by means of a drive which is coupled to at least one of the drums.

5. Oven according to claim 1, wherein the support means (23) are an endless element having an upper part (27) on which the conveyor belt (3, 10) bears, which upper part (27) can be moved in the same direction as the conveyor belt (3, 10).

6. Oven according to claim 5, wherein the endless element comprises at least one chain (24) which is guided over two shafts (26) which are provided with sprockets (25).

7. Oven according to claim 5, wherein each chain (24) comprises links which, in the upper part (27), each have a support surface facing the conveyor belt (3, 10).

8. Oven according to claim 7, wherein the endless element comprises at least two parallel chains (24).

9. Oven according to claim 5, wherein the endless element comprises a flexible belt.

10. Oven according to claim 5, wherein the tip part (27) of each endless element (24) is supported by a strip (36).

11. Oven according to claim 5, wherein the bottom part (38) of each endless element is supported by a strip (37).

12. Oven according to claim 1, wherein the support means comprise at least a support shaft or support roller.

13. Oven according to claim 1, wherein the conveyor belt (3) is a wire belt which comprises wire pieces which are oriented transversely to the conveyor belt and are attached to one another, such that they can rotate, around two axes oriented transversely to the direction of transport, one of which is in the plane of the conveyor belt (3) and the other of which is oriented perpendicularly thereto, as well as at least one conveyor chain (22) which is connected to or incorporated in the wire belt, which wire belt is guided over return shafts (11, 35) which are provided with sprockets for the conveyor chain (22).

14. Oven according to claim 13, wherein at least one of the return shafts (35) can be driven to provide supplementary driving of the conveyor belt (3) in the direction of transport.

15. Oven according to claim 1, wherein a tensioning device (12) is provided for tensioning the conveyor belt (3) around the two drums (6, 7).

16. Oven according to claim 1, wherein the conveyor belt (3) is supported by means of guide sections (36), coated with plastic strips, positioned beneath the conveyor belt in the direction of transport.

17. Oven according to claim 1, wherein the support means (23) are arranged below the straight path (10) which extends between the two helical paths and is located inside the housing (1).

18. Oven according to claim 1, wherein the support means (23) are arranged below the return path (14) which extends between the exit (5) from and the entrance (4) to the housing (1).

19. Oven according to claim 18, wherein the return path (14) with the support means (23) located beneath it are located outside the housing (1).

* * * * *